United States Patent
Edmondson, Jr.

(10) Patent No.: US 10,794,383 B2
(45) Date of Patent: Oct. 6, 2020

(54) VARIABLE SPEED PUMPING SYSTEM WITH PRESSURE INDEPENDENT CONTROL VALVES

(71) Applicant: James Christopher Edmondson, Jr., Durham, NC (US)

(72) Inventor: James Christopher Edmondson, Jr., Durham, NC (US)

(73) Assignee: James M. Pleasants Co., Inc., Greensboro, NC (US)

( * ) Notice: Subject to any disclaimer, the term of this patent is extended or adjusted under 35 U.S.C. 154(b) by 214 days.

(21) Appl. No.: 15/405,857

(22) Filed: Jan. 13, 2017

(65) Prior Publication Data

US 2017/0204866 A1 Jul. 20, 2017

Related U.S. Application Data

(60) Provisional application No. 62/278,646, filed on Jan. 14, 2016.

(51) Int. Cl.
| | |
|---|---|
| *F04D 15/00* | (2006.01) |
| *F24F 11/83* | (2018.01) |
| *F04D 29/44* | (2006.01) |
| *G05D 7/01* | (2006.01) |
| *F24F 11/85* | (2018.01) |
| *F04D 1/00* | (2006.01) |

(52) U.S. Cl.
CPC .......... *F04D 15/0066* (2013.01); *F04D 1/00* (2013.01); *F04D 15/0022* (2013.01); *F04D 15/0088* (2013.01); *F04D 29/441* (2013.01); *F24F 11/83* (2018.01); *F24F 11/85* (2018.01); *G05D 7/01* (2013.01)

(58) Field of Classification Search
CPC ........ F04D 1/00; F04D 11/83; F04D 15/0022; F04D 15/0088
USPC ............................ 60/431; 165/281, 282, 288
See application file for complete search history.

(56) References Cited

U.S. PATENT DOCUMENTS

| | | | | |
|---|---|---|---|---|
| 5,924,480 | A * | 7/1999 | Arima | F24F 5/0014 165/104.25 |
| 6,045,331 | A * | 4/2000 | Gehm | A01J 5/007 417/2 |
| 7,450,021 | B1 * | 11/2008 | Gehm | A01J 5/047 119/14.01 |
| 2005/0039797 | A1 * | 2/2005 | Carlson | G05D 7/0106 137/494 |
| 2008/0000307 | A1 | 1/2008 | Gysling et al. | |
| 2012/0185102 | A1 | 7/2012 | Skoglund et al. | |
| 2013/0048114 | A1 * | 2/2013 | Rothman | G05B 15/02 137/551 |

(Continued)

*Primary Examiner* — Philip E Stimpert
(74) *Attorney, Agent, or Firm* — Tuggle Duggins P.A.; Blake P. Hurt

(57) ABSTRACT

A system for managing the flow of fluids within a closed-loop system includes a pump controller and a variable-speed pump in communication with a conduit circuit including at least one one pressure-independent control valve (PICV). By using PICVs instead of conventional, two-way, two-way, pressure-dependent valves, the pump controller can monitor system needs and adjust the the speed of the variable-speed pump to more efficiently deliver pressure to the system without overshooting flow requirements, leading to less energy consumed and less cost incurred. A method method of variable-speed pumping including the use of PICVs is also disclosed.

10 Claims, 4 Drawing Sheets

(56) References Cited

U.S. PATENT DOCUMENTS

2015/0057810 A1 2/2015 Smith et al.

* cited by examiner

VARIABLE SPEED PUMPING SYSTEM WITH PRESSURE INDEPENDENT CONTROL VALVES

This non-provisional patent application claims all benefits under 35 U.S.C. § 119(e) of U.S. provisional patent application Ser. No. 62/278,646 filed 14 Jan. 2016, entitled "Variable Speed Pumping System with Pressure Independent Control Valves", in the United States Patent and Trademark Office, which is incorporated by reference in its entirety herein.

FIELD OF THE INVENTION

The invention herein pertains to closed-loop piping systems and particularly pertains to variable-speed pumps in combination with one or more pressure-independent control valves deployed within an HVAC piping system to control fluid flow and reduce pump energy consumption during operation.

DESCRIPTION OF THE PRIOR ART AND OBJECTIVES OF THE INVENTION

Varying the speed of pumps in heating, ventilation, and cooling (HVAC) piping systems has become standard operation in residential, commercial, industrial, and institutional facilities. Particularly in circulating fluid systems (often referred to as hydronic, specifically when the circulating fluid is water), varying the speed of pumps in closed-loop systems in response to a demand leads to a reduction in pump speed when demand decreases. Lower pump speed means that the pump consumes less electricity, as nearly all HVAC pumps rely on electricity to produce horsepower needed to drive the pump at high speeds.

The prior art contains various approaches to variable speed pumping that are more efficient efficient than constant speed applications, but are far from achieving optimal pumping system efficiency. Nearly all prior art variable-speed pumping systems in HVAC applications are controlled controlled on a methodology known as differential pressure setpoint (DPS for short). DPS requires requires the continuous monitoring of the supply pressure of the water being pumped into a terminal in the system versus the return pressure from the terminal using a differential pressure sensor. The difference between these two values at any given point during system operation is the the differential pressure (DP). In recent years, sensorless variable-speed pumping systems have been been developed which simulate the use of a remote DP sensor based on internal pump controller calculations of required system pump head. FIG. 1 illustrates a sensorless version of status-of-the-art status-of-the-art system while FIG. 2 demonstrates an embodiment with sensors. The prior art systems pictured in FIG. 2 rely on creating a "setpoint" or target for the desired DP. Variable-speed Variable-speed pumps are governed by control logic to maintain this DP setpoint under a variety of of operating conditions, ranging from relatively low, part-load conditions to full-load conditions. The higher the setpoint, the greater variability or "play" in the system, resulting in a system that will will always produce more pumping pressure than is needed, which wastes energy as additional electricity is needed to produce the horsepower responsible for the arbitrary overage in pressure. Conversely, the lower the setpoint, the less excess pumping pressure exists in the system, which leads to energy loss. However, given the unpredictable nature of pumping requirements over time, time, the overwhelming majority of systems appear to rely on higher setpoints, and attempt to pass pass the lower efficiency and higher costs on to system users.

Thus, in view of the problems and disadvantages associated with prior art devices, the present invention was conceived and one of its objectives is to provide a more efficient variable-speed, fluid pumping system.

It is another objective of the present invention to provide a variable-speed pumping system utilizing one or more pressure-independent control valves (PICVs).

It is still another objective of the present invention to provide a variable-speed pumping system without need of remote sensors located away from the pump (i.e. not in the full flow of the pump).

It is yet another objective of the present invention to provide a variable-speed pumping system that adjusts the pump speed, configuring the system to keep at least one PICV near the lowest end of its control operating range at all times. The selection and positioning of this PICV may vary based on changing load conditions, but this is the most energy-efficient manner to control a variable-speed pump utilizing PICVs while keeping each PICV in their respective control ranges, which is needed for them to function properly.

It is a further objective of the present invention to provide a variable-speed pumping system that includes a pump controller that continuously senses changes in pump flow to determine the lowest possible pump speed to maintain a specified pump flow.

It is still a further objective of the present invention to provide a method of variable-speed pumping utilizing a plurality of PICVs without need for remote sensors deployed at distal locations of the system relative to the pump.

It is yet a further objective of the present invention to provide a method of variable-speed pumping including the steps of sensing pump flow changes and increasing or decreasing pump speed to determine the lowest possible pump speed to maintain a desired pump flow.

Various other objectives and advantages of the present invention will become apparent to those skilled in the art as a more detailed description is set forth below.

SUMMARY OF THE INVENTION

The aforesaid and other objectives are realized by providing a pump controller and pump logic for controlling the speed of pumps in closed loop hydronic systems that includes two or more more pressure-independent control valves (PICVs) in fluid communication with the pump via a conduit. PICVs are designed to absorb fluctuations in pressure as demand changes elsewhere in the the system. These specialized valves keep flow constant though associated HVAC components such such as the heat-exchange coil, even as pressure changes elsewhere in the system. Each PICV includes an internal differential pressure regulator, which is designed to absorb increases in system system pressure via a spring-loaded compartment while facilitating steady fluid flow conditions. Therefore, fluid flow will only change in response to changes in load on a respective coil, and not the the opening or closing of valves elsewhere in the system. Each PICV has a valve-specific control control pressure operating range, which is a differential pressure that must be maintained across the the valve for it to function properly. Once each PICV operating range is met by the pump controller, controller, the pump controller gradually reduces pump speed to determine if reduced pump flow is is detected. In this graduated manner, the lowest possible pump speed based on the system demand demand is achieved.

DETAILED DESCRIPTION OF THE PREFERRED EMBODIMENT AND OPERATION OF THE INVENTION

Figure 1:
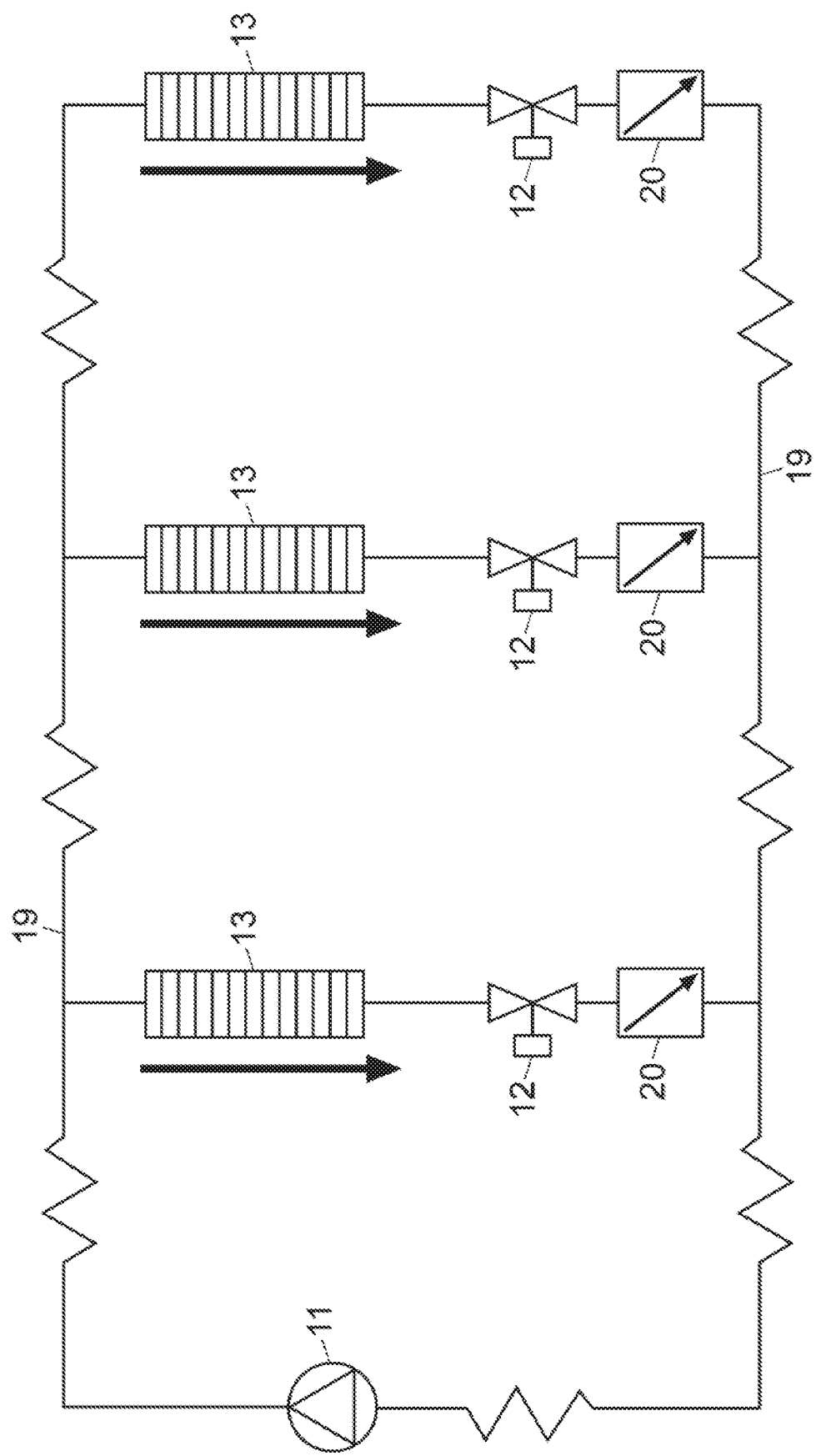
FIG. 1 shows a schematic representation of a conventional, closed-loop hydronic system without sensors.
Figure 2:
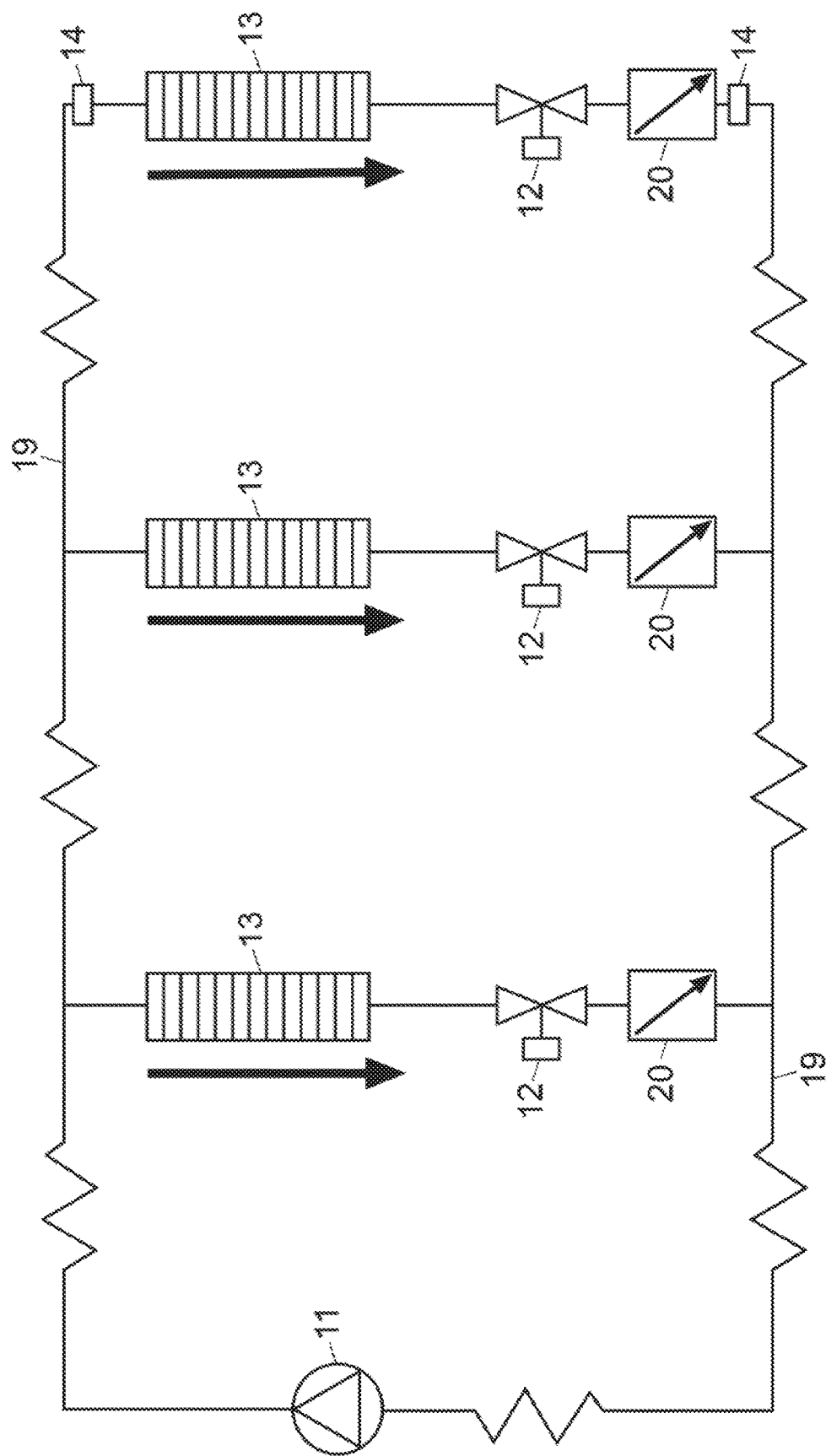
FIG. 2 pictures a schematic representation of a conventional, closed-loop hydronic system with differential pressure sensors.

For a better understanding of the invention and its operation, turning now to the drawings, various prior art solutions to variable-speed pumping are demonstrated in FIGS. 1-2. In each of these these circumstances, a number of assumptions are necessary to compare the respective systems' performance. In each case, pump 11 is a fluid pump, for example a centrifugal fluid-flow pump, specified for 1200 gallons per minute at 75 feet (a measure of friction loss relative to the weight of of the fluid measured vertically) and an Integrated Part Load Value (IPLV) load profile. IPLV is an an industry term developed by the Air-Conditioning, Heating, and Refrigeration Institute (AHRI) that that has an associated HVAC load profile that can be used as a standard when comparing different different HVAC systems or equipment. It is also assumed that the actual installed system required required pump head is 65 ft (less than the specified 75 ft, due to typical safety factors prevalent in HVAC pump head calculations). The schematic representations throughout FIGS. 1-3, indicate an an arbitrary number of exemplary heating and/or cooling zones (3 in the instant figures) but it should should be understood that the number of zones should not be construed as a limitation on the instant instant innovation. Similar numbers indicate similar structures across FIGS. 1-3, even if not explicitly explicitly stated. FIG. 1 illustrates a prior art, chilled water, hydronic system that is operated without without electronic sensors installed in the system and is based on control logic predicated on anticipated or predetermined system load, and represents the most unresponsive (and correspondingly, the least efficient) approach to variable-speed pumping. As the needs of the system system change, valves 12 (in the instant case, conventional, pressure-dependent, two-way valves) open or close based on the available pressure (hence the "pressure-dependent" terminology), but the the pump is providing an estimated system differential pressure based on internal controller calculations (for example, based on motor RPM or electrical draw) with no feedback from the hydronic system. FIG. 1 also illustrates flow restrictors 20 (arrows indicate fluid flow direction) which are typically used to ensure that the valves associated with one zone do not direct all fluid flow through that zone, preventing adequate fluid flow to other zones. They are necessary in closed-closed-loop systems like FIG. 1 but are not used in connection with systems employing PICVs as will will be described below. Table 1 demonstrates a representative data set of the system of FIG. 1 corresponding to pump speed, use, flow, pressure, and horsepower.

TABLE 1

| Percent Load | Hours/Yr | Flow Rate | Pump Head (feet) | Horsepower Req. |
|---|---|---|---|---|
| 100% | 43.2 | 1200 | 65 | 29 |
| 75% | 1814.4 | 900 | 50 | 17 |
| 50% | 1944 | 600 | 39 | 9 |
| 25% | 518.4 | 300 | 32 | 4 |

At an average cost of $0.08 per kilowatt hour, and assuming each zone stays equally loaded, the annual operating cost of this system is $2997. This analysis assumes that the sensorless pump controller simulates a virtual DP setpoint of 30 feet (or 40% of the specified pump head, which is common in the industry). This operating system is a vast improvement over constant-speed pumping applications, but is far from the most efficient utilization of a variable-speed pump.

FIG. 2 shows a prior art, chilled water, hydronic system with an electronic DP sensor 14 configured for 25 feet and positioned on the supply and returns sides of the system. Nearly all variable-speed HVAC pumping systems known in the art are configured and controlled in this manner. With a predetermined setpoint, the system in FIG. 2 relies on differential pressure setpoint setpoint theory for the pump to strive to maintain pressure across one or more DP sensors at all times times (for example, 25 feet of pressure across all valves 12, or more likely, across a single valve 12). This method involves continuously monitoring the supply pressure of the water being pumped pumped into a zone in the system versus the return pressure from the zone using a differential pressure sensor. The difference between these two values at any given time is the differential pressure (DP). Variable-speed pumps like pump 11 are configured to maintain the DP setpoint under under various operating conditions from the lowest "part-load" condition to full-load condition. For example, the DP in FIG. 2 may correspond to the drops resulting from flow across the coil 13, valve 12, and flow limiter 20 to maintain a flow of 400 gpm, even if the pressure to achieve this flow flow would only be required rarely. The higher the setpoint, the greater variability or "play" in the the system meaning that the system will typically produce an excess of pumping pressure than is mandated by the system need, which wastes energy since the excess pump speed is necessary to produce this excessive pressure. Conversely, the lower the setpoint, the less pumping pressure exists exists in the system, which reflects less energy use. As will be clear from FIG. 2, when the system system pressure differential starts to exceed the predetermined setpoint, this is an indication that control valves 12 are modulating closer to the closed position in response to decreased system load. Valves 12 may be responding to thermostatic conditions in the spaces or zones in which the the individual coil members 13 are serving. Valves 12 start to close when the zone requirements are are met. As valves 12 begin to modulate closed, this increases the pressure in the overall system between the supply side and the return side, causing the DP to rise. In response, the controller (not (not shown) for pump 11 responds by decreasing the speed of pump 11 so that the predetermined DP DP as measured by sensors 14 can be restored. Table 2 demonstrates a representative data set of the the system of FIG. 2 corresponding to pump speed, use, flow, pressure, and horsepower.

TABLE 2

| Percent Load | Hours/Yr | Flow Rate | Pump Head (feet) | Horsepower Req. |
|---|---|---|---|---|
| 100% | 43.2 | 1200 | 65 | 29 |
| 75% | 1814.4 | 900 | 48 | 16 |
| 50% | 1944 | 600 | 35 | 8 |
| 25% | 518.4 | 300 | 28 | 3 |

At an average cost of $0.08 per kilowatt hour, and assuming each zone stays equally loaded, the annual operating cost of this system is $2804. Although more efficient than the sensorless system of FIG. 1, more efficient approaches are possible.

FIG. 2 may also be configured to describe a chilled water hydronic system with electronic DP DP sensors 14 with a setpoint configured for 25 feet, but configured for downward adjustment or "reset" when the system controller determines that the system requirements are less than full load. Specifically, the DP setpoint is adjusted periodically to keep at least one pressure-dependent pressure-dependent control valve nearly (i.e. substantially) fully open (preferably 95% open). It should be noted, this system construction and logic is often mandated by state and federal energy codes that reference Standard 90.1-2010 and has been adopted by the American Society of Heating, Heating, Refrigeration, and Air-Conditioning Engineers (ASHRAE) (see Standard 90.1-2010, entitled Energy Standards for Buildings Except Low-Rise Residential Buildings) in the event a digital data control module (not shown) is implemented with the variable-speed pumping system (which is the case in most prior art, variable-speed pumping systems). This pumping control strategy, while useful for conventional, pressure-dependent control valves such as valves 12, cannot cannot be used in PICVs, if the PICVs are to stay within their preset operating control ranges. If the the DP setpoint is adjusted in a system containing PICVs, the result is that the system pressure will will dictate a change, but the PICVs will not alter their respective valve positions because, by definition they are immune from such pressure changes (i.e. pressure independent). In order to make make this system a reality with valves 12, it is necessary to monitor the valve position of all control control valves 12. Table 3 demonstrates a representative data set of this system, corresponding to to pump speed, use, flow, pressure, and horsepower.

TABLE 3

| Percent Load | Hours/Yr | Flow Rate | Pump Head (feet) | Horsepower Req. |
|---|---|---|---|---|
| 100% | 43.2 | 1200 | 65 | 29 |
| 75% | 1814.4 | 900 | 41 | 14 |
| 50% | 1944 | 600 | 24 | 5 |
| 25% | 518.4 | 300 | 13 | 2 |

At an average cost of $0.08 per kilowatt hour, and assuming each zone stays equally loaded, the annual operating cost of this system is $2225. This is an efficient control paradigm for systems that rely on conventional, pressure-dependent valves, but it cannot accommodate pressure-independent valves if they are to be kept within their control range.

In the examples presented in FIGS. 1-2 and Tables 1-3, and virtually every other known variable-speed pumping system, the operational sequence is largely the same: demand drops, control valves begin modulating closed, pressure sensors (if applicable) detect an increased pressure differential, pump controller slows down pump(s) in response to the increased differential, restoring the desired pressure differential and operating pump(s) at a more efficient speed given the current demand.

The ideal DP setpoint should be equal to, but not greater than the pressure drop imposed by the coil and piping components at the most remote or critical coil circuit at full flow with the associated control valve fully open. This configuration ensures that there can be enough pressure in the system so that any heating/cooling coil can receive full flow at any time to satisfy demand. Both the accuracy of the differential setpoint and the location of the pressure sensors greatly impact the operational efficiency of all variable-speed pumping systems, and the control systems associated therewith. Unfortunately, proper consideration is rarely given to the proper DP value and its calculation, even though it is the key to an efficient variable-speed pump system as described above. Often, this value is arbitrarily assigned on-site during system installation, and a common outcome is the selection of a DP value that is substantially higher than necessary, since erring on the side of a larger pressure differential ensures that there is enough pressure present in the system. This pressure overage or margin comes at an energy "cost", since it mandates an increase of horsepower at the pump head. Another problem with current practice is the imprecise location of the DP sensor. For maximum accuracy, sensors 14 should be located at the most remote of critical part of the hydronic system, with a supply water sensor 14 installed just upstream of the last coil in the system, and a return water sensor positioned just downstream of the same components, including coils, balancing devices, and flow limiters as contemplated in both system descriptions represented by FIG. 2. Unfortunately, many systems are installed with sensors 14 that are installed too close to the pump, either because it is convenient and requires less wiring (i.e. cheaper), or because the importance of the sensors are not fully understood. To cover the entire system with sensors 14, for example to accommodate environmental fluctuations which impact which valve is considered critical, would greatly increase system costs.

Figure 3:
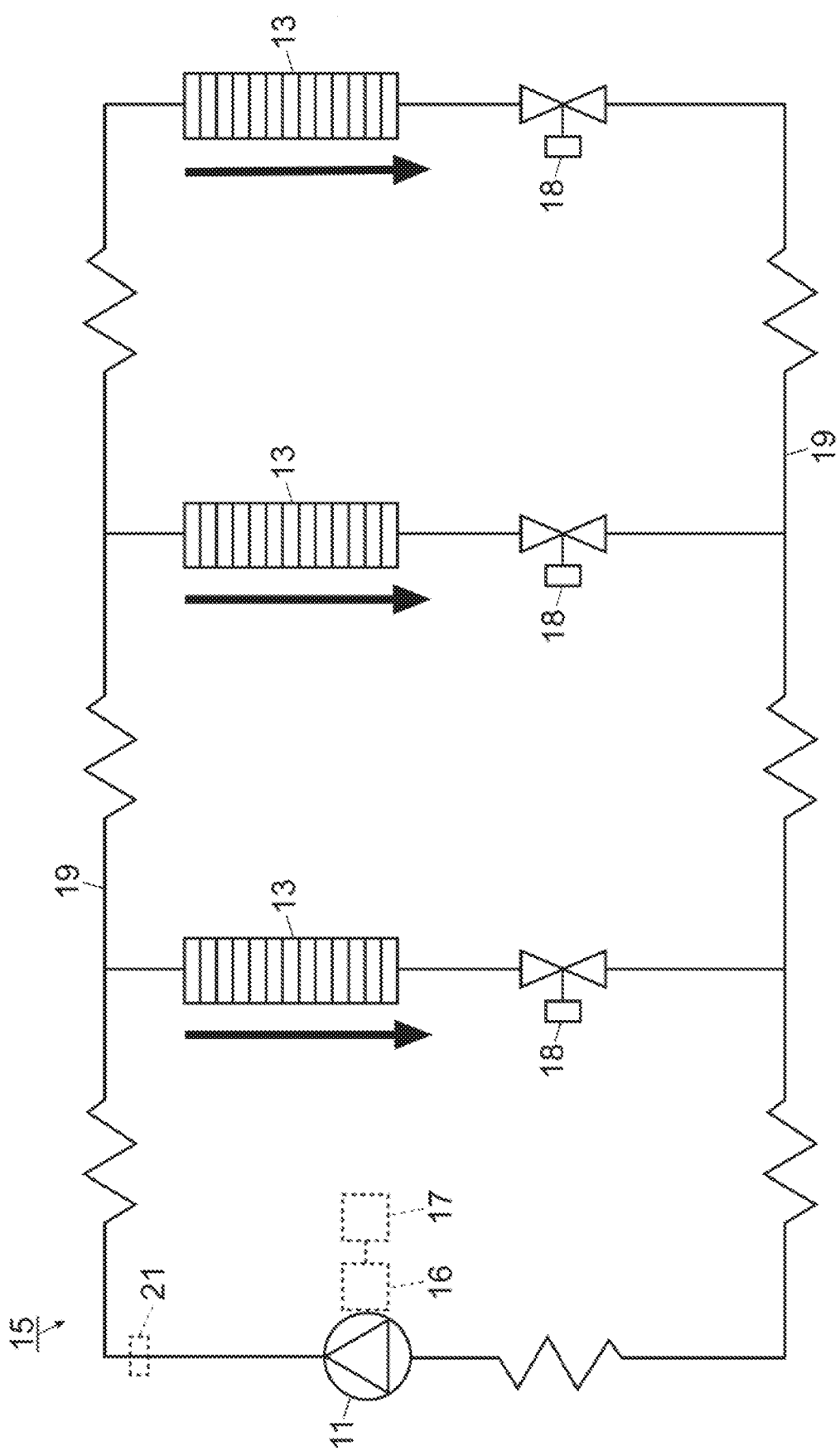
FIG. 3 demonstrates a schematic representation of a closed-loop hydronic system with pressure-independent control valves and a variable-speed pump.

One way to correct the aforementioned deficiency in the prior art variable-speed pumping systems is to deploy a number of sensors 14 both upstream and downstream of multiple valves in the the system, but due to the complexity of such a system, not to mention the increased cost, this solution is not always feasible, and as such a single sensor 14 is typically configured with a setpoint setpoint high enough to ensure that all valves 12 can obtain necessary flow, regardless of wasted energy. Therefore, preferred variable-speed pumping system 15 as seen in FIG. 3 is formed from a a series of conduits (represented schematically in linear form at 19) assembled in a closed loop for for the circulation and control of fluids such as water. A conventional motor 16 powers a variable-variable-speed pump 11 and is controlled by pump controller 17, for example a variable-frequency variable-frequency drive (VFD) or a programmable logic controller (PLC), although other examples examples of hardware, software, and firmware controllers are also within the scope of pump controller 17. Unlike the prior art systems, system 15 does not rely on common differential pressure-pressure-detecting equipment, so the shortcomings related to placement of sensors 14 and DP setpoints described above are eliminated. Instead, system 15 and pump controller 17 govern the operation of pump 11 based on actual system load, and not signals from poorly positioned pressure pressure differential detectors, as sensed by flow sensing devices 21 that need only be positioned within full flow of pump 11 (for example, by detecting pump flow or differential pressure). As would be appreciated by one of ordinary skill in the art, system 15 also includes a variety of hardware typically associated with conventional HVAC systems, but for the sake of brevity, such will not be described herein.

Preferred system 15 also includes at least one, and preferably a plurality of pressure-independent control valves (PICVs) 18 in fluid communication with the conduits of system 15. Each PICV is designed to absorb pressure fluctuations as demand changes elsewhere in the system, which allows PICVs to keep fluid flow steady through the associated coil, even as pressure changes elsewhere in the system. This is due to the internal construction of the PICV, an example of which is commercially available from Xylem under the trade name Ultra Setter™ and from Frese under the trade name OPTIMA™. Each PICV includes an internal pressure differential regulator, permitting absorption of increase in system pressure via a spring-loaded compartment (not shown) while maintaining steady flow conditions. Thus, flow will only change in response to changes in load on the respective coil, and not the opening or closing of valves such as two-way valves 12 elsewhere in the system. Each PICV has a valve-specific control pressure operating range, which is the differential pressure across the valve that must be maintained for it to work properly.

As a comparative example, consider the conventional, pressure-dependent, two-way valve exemplary of valve 12, in which if supply pressure increases at the valve, the flow through the valve increases as well. By comparison, when considering a PICV, when supply pressure increases, the flow through the valve does not increase. In utilizing PICVs 18, system 15 embodies control logic within controller 17 that will seek out the lowest pump speed to ensure that at least one PICV 18 is serviced at the lowest end of the control range, providing system 15 with all the fluid flow mandated by system requirements with the least amount of energy surplus expended.

Figure 4:
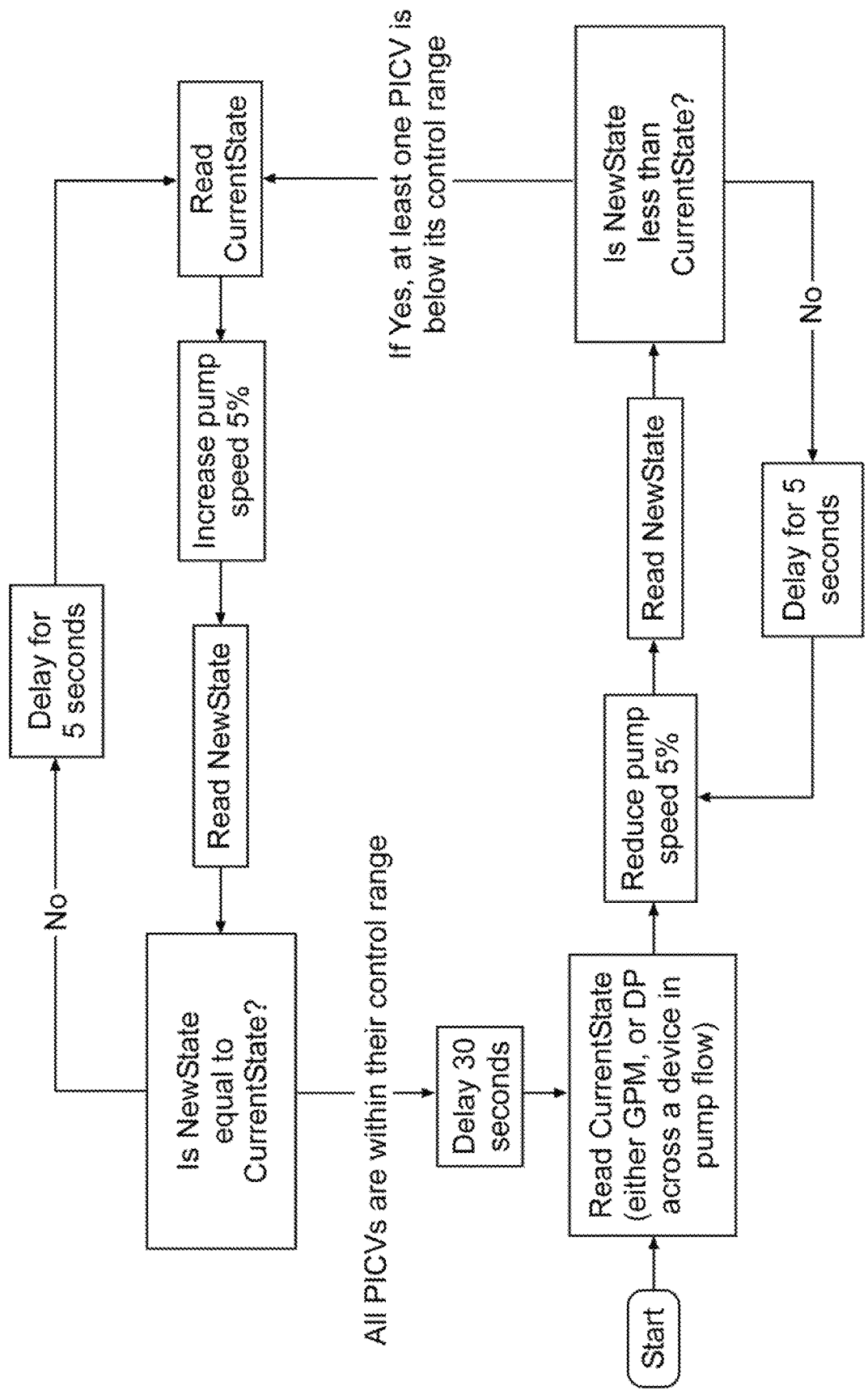
FIG. 4 illustrates the control logic of the system of FIG. 3 in flowchart form.

A method of optimizing a variable-speed fluid pumping system comprising a plurality of PICVs in fluid communication with a conduit network for circulating fluids, the conduit network driven by a pump 11 that is powered by a motor 16 and controlled by a controller 17. Each PICV 18 PICV 18 defines a control range (minimum and maximum differential pressure measured across the the valve) as specified by the valve manufacturer. Each PICV 18 also defines a minimum and maximum functional flow rate. If the PICV is operated within its pressure control range, it is capable of maintaining a flow rate with less than 5% variation over time (on average). As shown in shown in the flowchart in FIG. 4, as system 15 becomes operational, controller 17 detects a first measurement of the system, for example the rate of pumping at pump 11 in gallons per minute (GPM) or the differential pressure across a device in full pump flow (for example a pump discharge discharge valve, flow meter, blade meter, strainer, or ball valve, and including sensorless pump flow flow calculation devices, demonstrated schematically as 21). The speed of pump 11 is reduced by by 5%, and controller 17 detects a second system measurement. If after the decrease in pump speed, speed, no difference in values is detected (specifically if the second system measurement is substantially equal to [i.e. within 1%] the first system measurement), controller 17 delays a first time time period (i.e. non-instantaneous delay), for example about 5 seconds, and then the speed of pump pump 11 is decreased another 5%, and the second system measurement is taken and again compared compared to the first system measurement (or the initial "second" system measurement, which may may replace the first system measurement if loop is repeated). This loop continues until the second second measurement is determined to be less than the first system measurement, at which time controller 17 determines that at least one PICV is below the predetermined minimum control range. The following step first detects a third system measurement and then increases pump speed speed by 5%. A fourth system measurement is recorded, and the third system measurement is compared to the fourth system measurement. If the third and fourth system measurements are substantially equal (within 1%), and more preferably if they are equal, controller 17 has determined determined that all PICVs 18 are within their respective control ranges. If, however, the fourth system measurement is not substantially equal to the third system measurement, controller 17 delays delays for a time period, for example about 5 seconds, and then the third system measurement is recorded, the speed of pump 11 is increased by 5%, and the fourth system measurement is detetmined again, seeking an equality between the third and fourth system measurements. In seeking seeking the lowest pump speed that sufficiently services all PICVs in this manner, system 15 has demonstrated a statistically significant improvement in cost and efficiency over time. For example, example, Tables 1-3 and following demonstrate the energy usage and cost of their respective systems. By comparison, the annual cost for system 15 with PICVs 18 as described would $2048, $2048, representing a savings over the prior art systems, either by avoiding the costs of DP sensors sensors on the front end or continuous monitoring of valve 12 positions over time (see Table 4 below).

TABLE 4

| Percent Load | Hours/Yr | Flow Rate | Pump Head (feet) | Horsepower Req. |
|---|---|---|---|---|
| 100% | 43.2 | 1200 | 60 | 27 |
| 75% | 1814.4 | 900 | 38 | 13 |
| 50% | 1944 | 600 | 23 | 5 |
| 25% | 518.4 | 300 | 13 | 1 |

At an average cost of $0.08 per kilowatt hour, assuming each zone stays equally loaded, the annual operating cost of this system is $2048. The pressure drop of the flow restrictors 20 is not included since PICVs do not need flow balancing devices.

The illustrations and examples provided herein are for explanatory purposes and are not intended to limit the scope of the appended claims.

I claim:

1. A closed-loop hydronic system comprising,
a variable-speed pumping device further comprising an inlet and an outlet, the variable-speed pumping device configured for operation with the closed-loop hydronic system,
pressure-independent control valve (PICV) including an internal differential pressure regulator configured to absorb change(s) in pressure via a spring-loaded compartment, the pressure-independent control valve defining a predetermined control pressure operating range including a minimum required differential pressure, a controller,
at least one flow sensing device in communication with the variable-speed pumping device, wherein the variable-speed pumping device inlet is in fluid communication with one or more conduits, the pressure-independent control valve and the at least one flow sensing device are in fluid communication with the one or more conduits, and the variable-speed pumping device outlet is in fluid communication with the one or more conduits, so as to define the closed-loop hydronic system, wherein the at least one flow sensing device detects a first system measurement, and wherein a speed of the variable-speed pump is decreased, and wherein the at least one flow sensing device detects a second system measurement, and wherein the controller is configured to determine whether to increase or decrease the speed of the variable-speed pump in response to a comparison of the first system measurement and the second system measurement indicating whether a differential pressure across the pressure-independent control valve is less than the minimum required differential pressure.

2. The closed-loop hydronic system of claim 1 wherein the flow sensing device is selected from the group consisting of a flow meter, blade meter, device in full pump flow, and a sensorless pump flow calculation device.

3. The closed-loop hydronic system of claim 1 wherein the decrease in speed of the variable-speed pump is defined as 5%.

4. The closed-loop hydronic system of claim 1 wherein the detection of the first and second system measurements are separated by a non-instantaneous delay.

5. The closed-loop hydronic system of claim 4 wherein the non-instantaneous delay is defined as 5 seconds.

6. The closed-loop hydronic system of claim 1 wherein the at least one flow sensing device detects a third system measurement, and wherein the variable-speed pumping device is increased, and wherein the at least one flow sensing device detects a fourth system measurement, and wherein the at least one flow sensing device compares the third system measurement to the fourth system measurement, determining whether to increase, maintain, or decrease the speed of the variable-speed pump based on system needs.

7. The closed-loop hydronic system of claim 6 wherein the increase in speed of the variable-speed pump is defined as 5%.

8. The closed-loop hydronic system of claim 6 wherein the detection of the first and second system measurements are separated by a non-instantaneous delay.

9. The closed-loop hydronic system of claim 8 wherein the non-instantaneous delay is defined as 5 seconds.

10. The closed loop hydronic system of claim 1, Wherein the pressure-independent control valve is one of a plurality of pressure-independent control valves each having a respective minimum required differential pressure, and wherein the controller is configured to determine whether to increase or decrease the speed of the variable speed pump in response to a comparison between the first system measurement and the second system measurement indicating whether a differential pressure across any one of the plurality of pressure-independent control valves is less than the respective minimum required differential pressure.

* * * * *